(12) United States Patent
Taherzadeh Boroujeni et al.

(10) Patent No.: US 12,021,595 B2
(45) Date of Patent: Jun. 25, 2024

(54) CHANNEL STATE INFORMATION REFERENCE SIGNALS SCHEDULED BY REMAINING MINIMUM SYSTEM INFORMATION CONTROL CHANNEL

(71) Applicant: QUALCOMM Incorporated, San Diego, CA (US)

(72) Inventors: Mahmoud Taherzadeh Boroujeni, San Diego, CA (US); Tao Luo, San Diego, CA (US); Iyab Issam Sakhnini, San Diego, CA (US); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 163 days.

(21) Appl. No.: 17/211,649

(22) Filed: Mar. 24, 2021

(65) Prior Publication Data

US 2021/0306052 A1 Sep. 30, 2021

Related U.S. Application Data

(60) Provisional application No. 63/001,208, filed on Mar. 27, 2020.

(51) Int. Cl.
| | |
|---|---|
| *H04B 7/06* | (2006.01) |
| *H04L 5/00* | (2006.01) |
| *H04W 56/00* | (2009.01) |
| *H04W 72/044* | (2023.01) |
| *H04W 72/23* | (2023.01) |
| *H04W 72/30* | (2023.01) |

(52) U.S. Cl.
CPC ......... *H04B 7/0695* (2013.01); *H04B 7/0626* (2013.01); *H04L 5/0051* (2013.01); *H04W 56/001* (2013.01); *H04W 72/046* (2013.01); *H04W 72/23* (2023.01); *H04W 72/30* (2023.01)

(58) Field of Classification Search
CPC .... H04B 7/0695; H04B 7/0626; H04B 7/086; H04B 7/024; H04B 7/0686; H04L 5/0051; H04L 5/0023; H04L 5/0048; H04L 5/0094; H04W 56/001; H04W 72/005; H04W 72/042; H04W 72/046; H04W 48/12; H04W 72/04
See application file for complete search history.

(56) References Cited

U.S. PATENT DOCUMENTS

| | | | |
|---|---|---|---|
| 2017/0245259 A1* | 8/2017 | Islam | H04B 7/0617 |
| 2019/0191457 A1* | 6/2019 | Si | H04W 48/12 |
| 2020/0059891 A1* | 2/2020 | Huang | H04W 72/04 |
| 2020/0119874 A1* | 4/2020 | Liu | H04W 72/042 |
| 2020/0195324 A1* | 6/2020 | Grant | H04B 7/024 |
| 2022/0095118 A1* | 3/2022 | Harada | H04W 56/0015 |

* cited by examiner

*Primary Examiner* — Kiet Tang
(74) *Attorney, Agent, or Firm* — Patterson + Sheridan, L.L.P.

(57) ABSTRACT

Certain aspects of the present disclosure provide techniques for transmitting channel state information reference signals (CSI-RS) scheduled by a remaining minimum system information (RMSI) physical downlink control channel (PDCCH) for use by a user equipment (UE) for beam refinement. A method by a user equipment (UE) includes receiving a physical downlink control channel (PDCCH), from a base station (BS), that schedules transmission of a remaining minimum system information (RMSI) and schedules transmission of a channel state information (CSI) reference signal (CSI-RS) by the BS; and processing the CSI-RS.

30 Claims, 8 Drawing Sheets

CHANNEL STATE INFORMATION REFERENCE SIGNALS SCHEDULED BY REMAINING MINIMUM SYSTEM INFORMATION CONTROL CHANNEL

CROSS-REFERENCE TO RELATED APPLICATIONS

This application claims benefit of and priority to U.S. Provisional Patent Application No. 63/001,208, filed Mar. 27, 2020, which is assigned to the assignee hereof and herein incorporated by reference in its entirety as if fully set forth below and for all applicable purposes.

BACKGROUND

Field of the Disclosure

Aspects of the present disclosure relate to wireless communications, and more particularly, to techniques for transmitting channel state information reference signals (CSI-RS) scheduled by a remaining minimum system information (RMSI) physical downlink control channel (PDCCH) for use by a user equipment (UE) for beam refinement.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved reception of remaining minimum system information (RMSI) by user equipments from base stations in a wireless network.

Certain aspects provide a method for wireless communications by a user equipment (UE). The method generally includes: receiving a physical downlink control channel (PDCCH), from a base station (BS), that schedules transmission of a remaining minimum system information (RMSI) and schedules transmission of a channel state information (CSI) reference signal (CSI-RS) by the BS; and processing the CSI-RS.

Certain aspects provide a method for wireless communications by a base station (BS). The method generally includes: transmitting a physical downlink control channel (PDCCH) that schedules transmission of a remaining minimum system information (RMSI) and schedules transmission of a channel state information (CSI) reference signal (CSI-RS) by the BS; and transmitting the CSI-RS.

Certain aspects provide an apparatus in a wireless communications system. The apparatus generally includes: a memory; and a processor coupled to the memory and configured to: receive a physical downlink control channel (PDCCH), from a base station (BS), that schedules transmission of a remaining minimum system information (RMSI) and schedules transmission of a channel state information (CSI) reference signal (CSI-RS) by the BS; and process the CSI-RS.

Certain aspects provide an apparatus in a wireless communications system. The apparatus generally includes: a memory; and a processor coupled to the memory and configured to: transmit a physical downlink control channel (PDCCH) that schedules transmission of a remaining minimum system information (RMSI) and schedules transmission of a channel state information (CSI) reference signal (CSI-RS) by the apparatus; and transmit the CSI-RS.

Certain aspects provide an apparatus in a wireless communications system. The apparatus generally includes: means for receiving a physical downlink control channel (PDCCH), from a base station (BS), that schedules transmission of a remaining minimum system information (RMSI) and schedules transmission of a channel state information (CSI) reference signal (CSI-RS) by the BS; and means for processing the CSI-RS.

Certain aspects provide an apparatus in a wireless communications system. The apparatus generally includes: means for transmitting a physical downlink control channel (PDCCH) that schedules transmission of a remaining minimum system information (RMSI) and schedules transmission of a channel state information (CSI) reference signal (CSI-RS) by the apparatus; and means for transmitting the CSI-RS.

Certain aspects provide a computer readable medium storing computer executable code. The code, when executed by a processing system, causes the processing system to perform operations generally including: receiving a physical downlink control channel (PDCCH), from a base station (BS), that schedules transmission of a remaining minimum system information (RMSI) and schedules transmission of a channel state information (CSI) reference signal (CSI-RS) by the BS; and processing the CSI-RS.

Certain aspects provide a computer readable medium storing computer executable code. The code, when executed by a processing system in a base station (BS), causes the processing system to perform operations generally including: transmitting a physical downlink control channel (PDCCH) that schedules transmission of a remaining minimum system information (RMSI) and schedules transmission of a channel state information (CSI) reference signal (CSI-RS) by the BS; and transmitting the CSI-RS.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
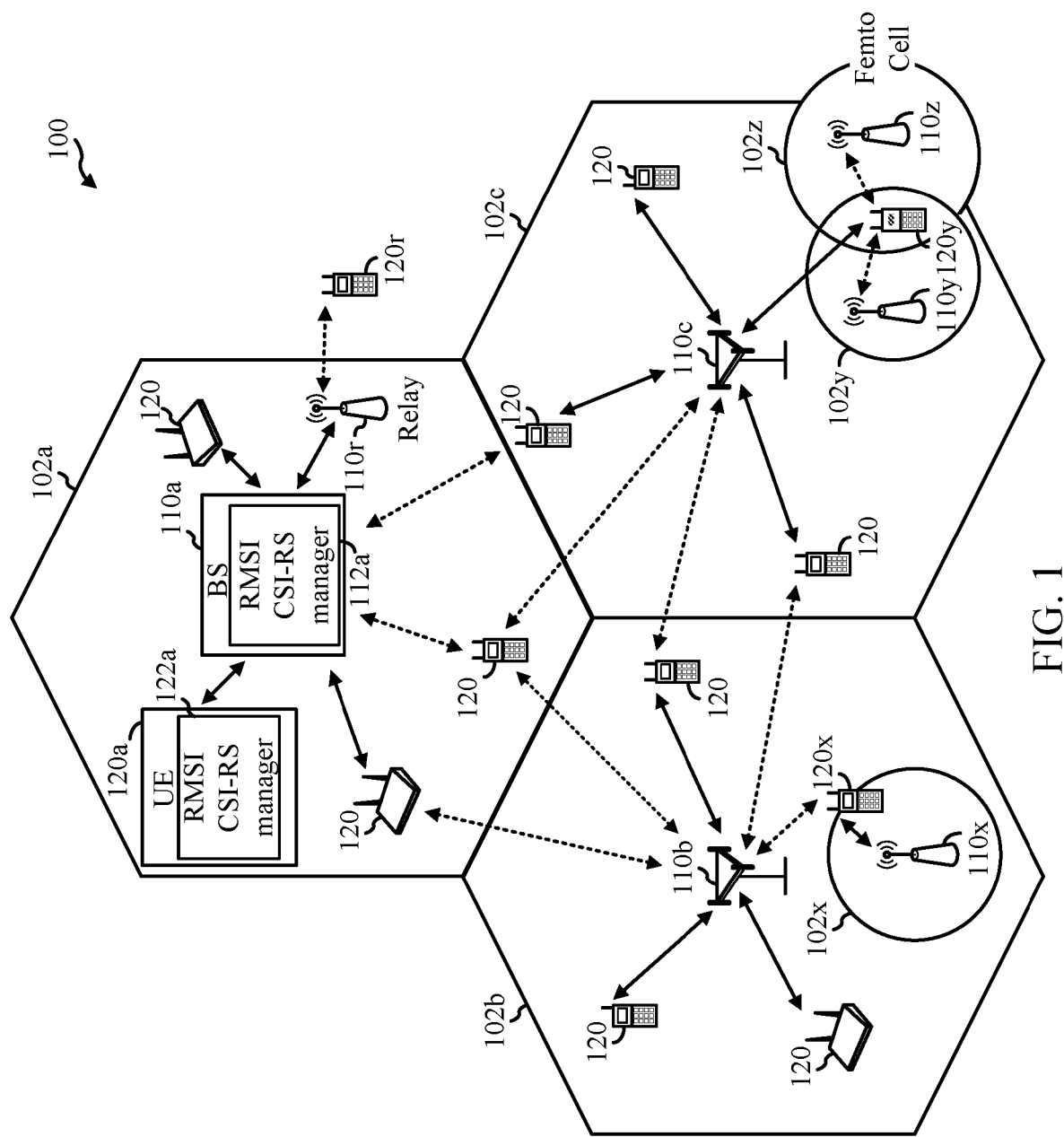
FIG. 1 is a block diagram conceptually illustrating an example telecommunications system, in accordance with certain aspects of the present disclosure.
Figure 1:
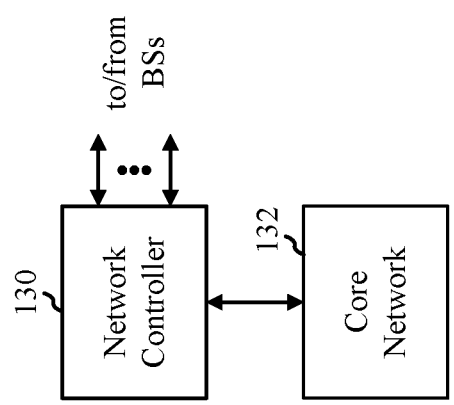

Aspects of the present disclosure provide apparatus, methods, processing systems, and computer readable mediums for transmitting channel state information reference signals (CSI-RS) scheduled by a remaining minimum system information (RMSI) physical downlink control channel (PDCCH) for use by a user equipment (UE) for beam refinement.

In certain systems, such as new radio (e.g., 5G NR) systems, it is desirable for a user equipment (UE) to receive system information, referred to as remaining minimum system information (RMSI), in addition to the system information available from broadcasts. Receiving RMSI can be a bottleneck for the coverage of millimeter-wave 5G communications systems. One reason for the limited coverage of RMSI is that a transmitting BS (e.g., a next generation NodeB (gNB)) typically uses wide broadcast beams (similar to or the same as synchronization signal block (SSB) beams) for transmission of the RMSI. Beam refinement may improve the coverage of the RMSI by increasing the beam gain. Beam refinement can be done at a transmitter or a receiver. It may be noted that in the case of RMSI, the receiver is the UE.

Aspects of the present disclosure provide techniques, apparatus, processing systems, and computer readable media, for beam indication set determination. For example, aspects of the present disclosure provide for a predetermined set of candidate (e.g., active and/or configured candidate set) transceiver control interface (TCI) states and/or spatial relations as a function of time and/or UE movement states or location.

The following description provides examples of beam indication set determination, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

The techniques described herein may be used for various wireless networks and radio technologies. While aspects may be described herein using terminology commonly associated with 3G, 4G, and/or 5G wireless technologies, aspects of the present disclosure can be applied in other generation-based communication systems, including later technologies.

New Radio (NR) is an emerging wireless communications technology under development in conjunction with the 5G Technology Forum (5GTF). NR access (e.g., 5G NR) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR may and include support for half-duplex operation using time division duplexing (TDD). Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network.

In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells.

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r) that receive a transmission of data and/or other information from an upstream station (e.g., a BS 110a or a UE 120r) and sends a transmission of the data and/or other information to a downstream station (e.g., a UE 120 or a BS 110) to facilitate communication between devices. A network controller 130 may couple to a set of BSs and provide coordination and control for these BSs. The network controller 130 may communicate with the BSs 110 via a backhaul.

The wireless communication network 100 may be an NR system (e.g., a 5G NR network). The devices may be configured for beam indication set determination. As shown in FIG. 1, the BS 110a has a RMSI CSI-RS manager 112a and the UE 120a has a RMSI CSI-RS manager 122a. The RMSI CSI-RS manager 112a may be configured to transmit a physical downlink control channel (PDCCH) that schedules transmission of a remaining minimum system information (RMSI) and schedules transmission of a channel state information (CSI) reference signal (CSI-RS) by the BS; and transmit the CSI-RS, in accordance with aspects of the present disclosure. The RMSI CSI-RS manager 122a may be configured to receive a physical downlink control channel (PDCCH), from a base station (BS), that schedules transmission of a remaining minimum system information (RMSI) and schedules transmission of a channel state information (CSI) reference signal (CSI-RS) by the BS; and to process the CSI-RS, in accordance with aspects of the present disclosure. The RMSI CSI-RS manager 112a may be configured to determine a subset of the multiple configured beam indication sets based on the one or more parameters.

Figure 2:
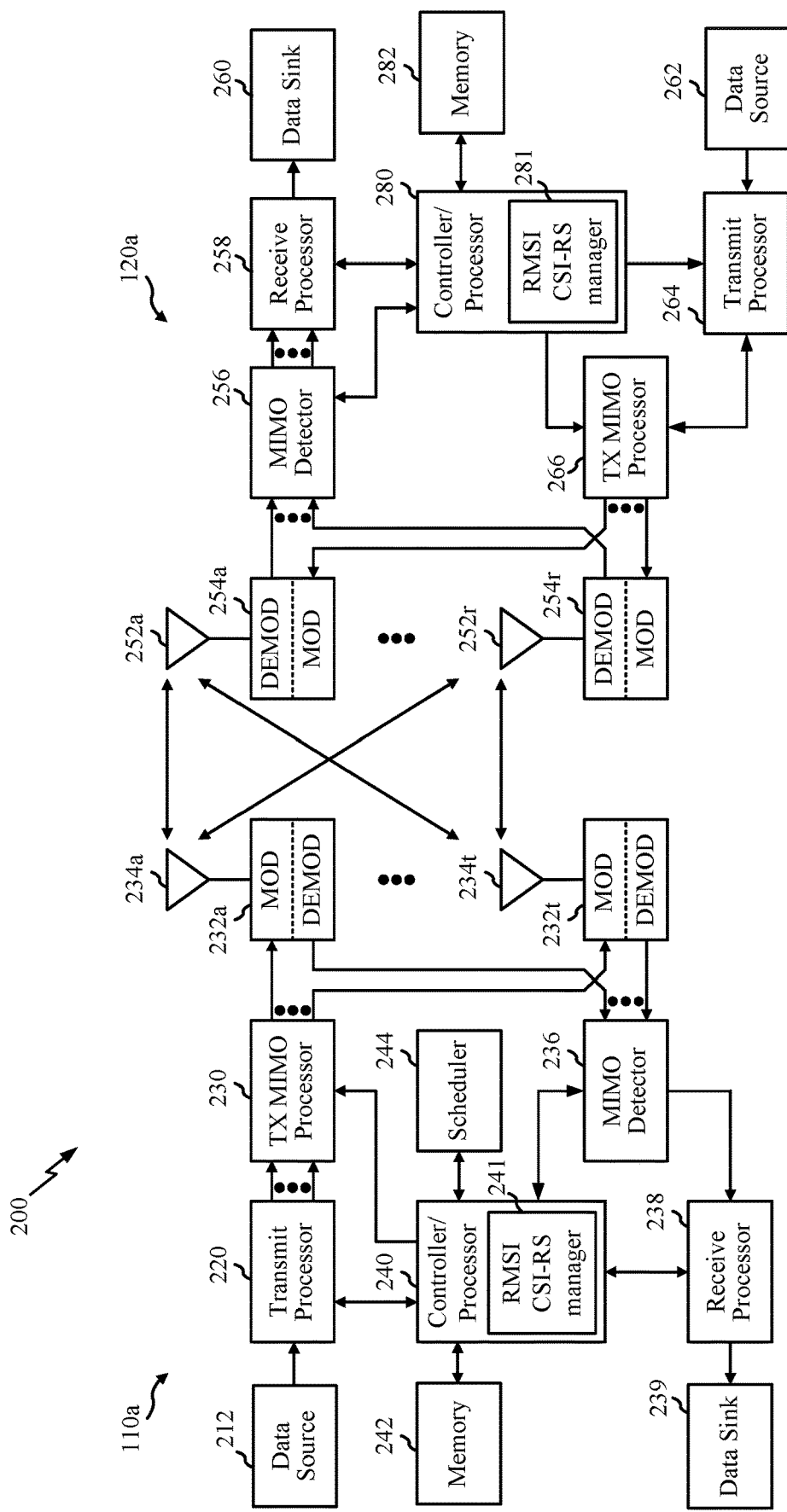
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a PDSCH, a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120 may be received by the antennas 234, processed by the demodulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

Antennas 252, processors 266, 258, 264, and/or controller/processor 280 of the UE 120 and/or antennas 234, processors 220, 230, 238, and/or controller/processor 240 of the BS 110a may be used to perform the various techniques and methods described herein. For example, as shown in FIG. 2, the controller/processor 240 of the BS 110a has a RMSI CSI-RS manager 241 that may be configured for transmitting a physical downlink control channel (PDCCH) that schedules transmission of a remaining minimum system information (RMSI) and schedules transmission of a channel state information (CSI) reference signal (CSI-RS) by the BS; and for transmitting the CSI-RS, according to aspects described herein. The controller/processor 280 UE 120 has a RMSI CSI-RS manager 281 that may be configured for receiving a physical downlink control channel (PDCCH), from a base station (BS), that schedules transmission of a remaining minimum system information (RMSI) and schedules transmission of a channel state information (CSI) reference signal (CSI-RS) by the BS; and for processing the CSI-RS, according to aspects described herein. The memories 242 and 282 may store data and program codes for BS 110 and UE 120, respectively. A scheduler 244 may schedule UEs for data transmission on the downlink and/or uplink.

NR may utilize orthogonal frequency division multiplexing (OFDM) on the downlink and single-carrier frequency division multiplexing (SC-FDM) on the uplink. OFDM and SC-FDM partition the system bandwidth into multiple orthogonal subcarriers, also referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a "resource block" (RB), may be 12 consecutive frequency subcarriers (or 180 kHz). The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.). The symbol and slot lengths scale with the subcarrier spacing.

Figure 3:
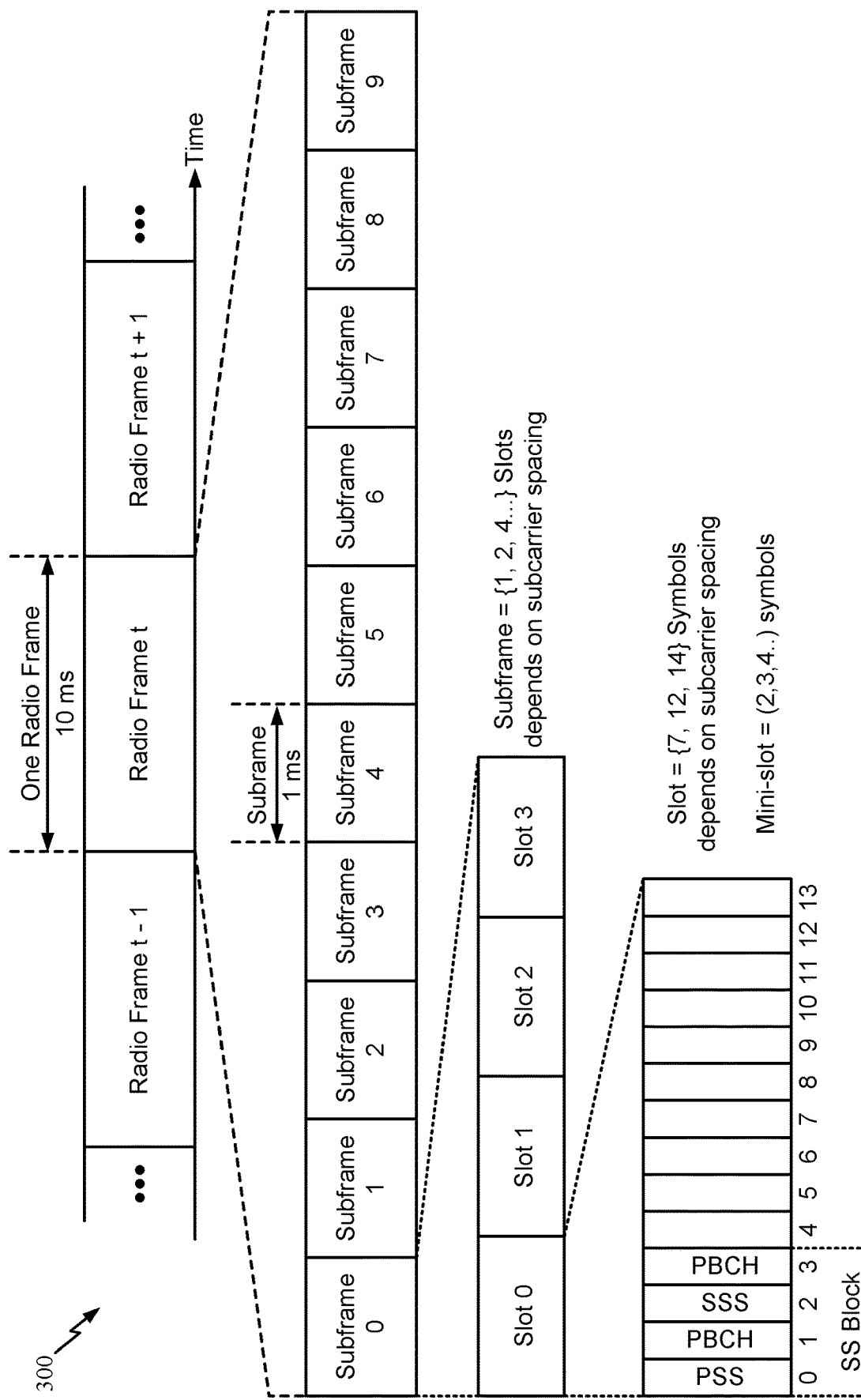
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIB s), other system information (OSI) can be transmitted on a PDSCH in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

In some examples, the communication between the UEs 120 and BSs 110 is referred to as the access link. The access link may be provided via a Uu interface. Communication between devices may be referred as the sidelink.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE 120a) to another subordinate entity (e.g., UE 120) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum). One example of sidelink communication is PC5, for example, as used in V2V, LTE, and/or NR.

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions. The PSFCH may carry feedback such as CSI related to a sidelink channel quality.

Example Channel State Information Reference Signals Scheduled by Remaining Minimum System Information Control Channel Aspects of the present disclosure provide apparatus, methods, processing systems, and computer readable mediums for transmitting channel state information reference signals (CSI-RS) scheduled by a remaining minimum system information (RMSI) physical downlink control channel (PDCCH) for use by a user equipment (UE) for beam refinement.

In certain systems, such as new radio (e.g., 5G NR) systems, it is desirable for a user equipment (UE) to receive system information, referred to as remaining minimum system information (RMSI), in addition to the system information available from broadcasts. Receiving RMSI can be a bottleneck for the coverage of millimeter-wave 5G communications systems. One reason for the limited coverage of RMSI is that a transmitting BS (e.g., a next generation NodeB (gNB)) typically uses wide broadcast beams (the same as synchronization signal block (SSB) beams) for transmission of the RMSI. Beam refinement may improve the coverage of the RMSI by increasing the beam gain. Beam refinement can be done at a transmitter or a receiver. It may be noted that in the case of RMSI, the receiver is the UE.

According to aspects of the present disclosure, a BS (e.g., a gNB) may schedule transmission of CSI-RS by use of a physical downlink control channel (PDCCH) scheduling RMSI. The CSI-RS may be scheduled to be transmitted before the RMSI scheduled by the PDCCH.

In aspects of the present disclosure, the CSI-RS may be used by a UE for receive beams refinement before the UE receives the RMSI.

Additionally or alternatively, the CSI-RS may be used by the UE for better channel estimation for receiving the RMSI.

According to aspects of the present disclosure, the refined receive beam may be later be used by the UE as a transmit beam for transmitting a physical random access channel (PRACH) first message (msg1) and/or for transmitting a PRACH third message (msg3) in a 4-step random access channel (RACH) procedure.

Alternatively, the refined receive beam may be later be used by the UE as a transmit beam for transmitting message A (msgA) in a 2-step RACH procedure.

In aspects of the present disclosure, the refined beam may later be used by the UE for reception of a PRACH second message (msg2) and/or for reception of a PRACH fourth message (msg4) in a 4-step RACH procedure.

Alternatively, the refined beam may later be used by the UE for reception of message B (msgB) in a 2-step RACH procedure.

According to aspects of the present disclosure, the mapping of a bitfield in the downlink control information (DCI) carried by an RMSI PDCCH and the resources and parameters of CSI-RS may be dependent on parameters of a Type0-PDCCH common search space (CSS). For example, one or more bitfields in a physical broadcast channel (PBCH) that are used for configuration of control resource set 0 (CORESET0) may also indicate a different mapping between bits of an RMSI PDCCH and resources and parameters of a CSI-RS scheduled by the RMSI PDCCH.

In aspects of the present disclosure, in case of RMSI repetition, CSI-RS scheduled by the RMSI PDCCH may correspond to each RMSI repetition (e.g., a CSI-RS is transmitted one slot before each RMSI repetition) or a subset of the RMSI repetitions. For example, CSI-RS scheduled by an RMSI PDCCH may be only transmitted before a first instance of RMSI repetition.

According to aspects of the present disclosure, validity of CSI-RS scheduling may depend on a time gap between RMSI (and/or CSI-RS) and SSB. For example, CSI-RS may be transmitted only if a time gap between RMSI and SSB is greater than a certain threshold (e.g., two slots).

In aspects of the present disclosure, scheduling of CSI-RS by RMSI PDCCH may be indicated by PBCH. For example, one bit (e.g., a bit that is reserved in previously known techniques) in a PBCH may be used to indicate scheduling of CSI-RS by RMSI PDCCH.

According to aspects of the present disclosure, scheduling of CSI-RS by RMSI PDCCH may be indicated by an alternative interpretation of one or more bitfields in a PBCH that are used for configuration of CORESET0. In such aspects of the present disclosure, legacy UEs may use the old interpretation of the CORESET0 configuration bitfields in the PBCH. For example, a new column may be added to one or more configuration tables (e.g., Table 13.12 of TS 38.213 (which is publicly available), for SS/PBCH block and control resource set multiplexing pattern 1 and frequency range 2) of PDCCH monitoring occasions for the Type0-PDCCH common search space to indicate the scheduling of CSI-RS by RMSI PDCCH.

Figure 4:
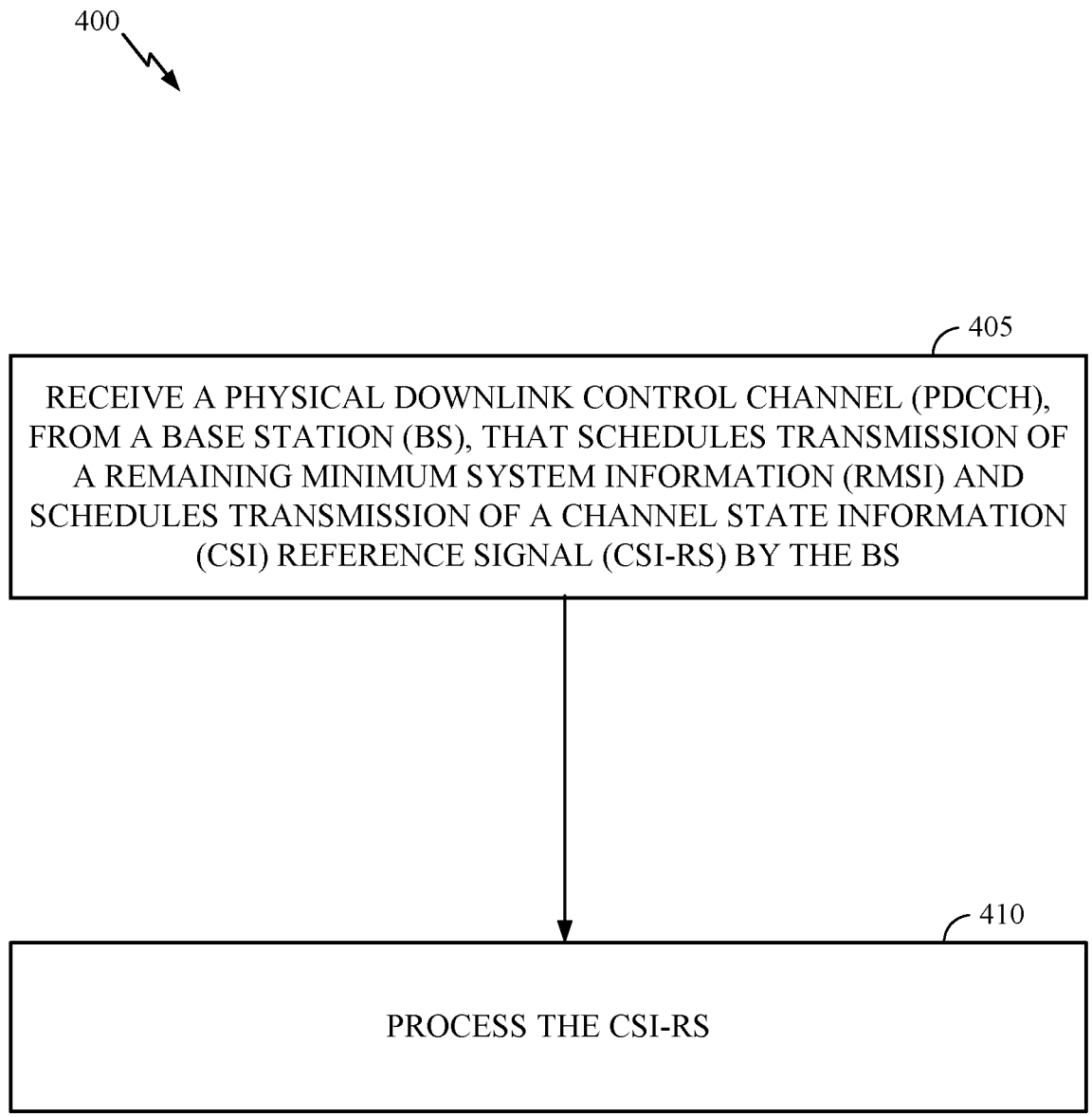
FIG. 4 is a flow diagram illustrating example operations for wireless communication by a UE, in accordance with certain aspects of the present disclosure.

FIG. 4 is a flow diagram illustrating example operations 400 for wireless communication, in accordance with certain aspects of the present disclosure. The operations 400 may be performed, for example, by a UE (e.g., such as a UE 120a in the wireless communication network 100). Operations 400 may be implemented as software components that are executed and run on one or more processors (e.g., controller/processor 280 of FIG. 2). Further, the transmission and reception of signals by the UE in operations 400 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 400 may begin, at block 405, by receiving a physical downlink control channel (PDCCH), from a base station (BS), that schedules transmission of a remaining minimum system information (RMSI) and schedules transmission of a channel state information (CSI) reference signal (CSI-RS) by the BS. For example, UE 120a (shown in FIG. 1) receives a PDCCH, from BS 110a (shown in FIG. 1), that schedules transmission of RMSI and schedules transmission of a CSI-RS by the BS. That is, the PDCCH schedules a transmission of RMSI, and the PDCCH schedules transmission of a CSI-RS, and those transmissions of RMSI and CSI-RS are by the BS (BS 110a) that transmits the PDCCH.

At block 410, operations 400 continue by processing the CSI-RS. Continuing the example, the UE 120a processes the CSI-RS that were scheduled by the PDCCH of block 405. The UE may, for example, refine a receive beam based on the CSI that the UE determines based on the processing of the CSI-RS.

According to aspects of the present disclosure, a UE performing operations 400 may refine a receive beam based on the CSI-RS. In some aspects of the present disclosure, the UE may receive the RMSI using the refined receive beam; thus, the BS may transmit the CSI-RS prior to transmitting the RMSI.

In aspects of the present disclosure, processing the CSI-RS as in block 410 may include determining one or more parameters of the CSI-RS based on a bitfield in the PDCCH and a Type0 PDCCH common search space. In some aspects of the present disclosure, the determination is further based on another bitfield in a physical broadcast channel (PBCH).

According to aspects of the present disclosure, the PDCCH of block 405 schedules transmission of a plurality of repetitions of the RMSI, and a UE performing operations 400 may process a corresponding CSI-RS for each of the plurality of the repetitions of the RMSI.

In aspects of the present disclosure, a UE performing operations 400 may determine that the PDCCH of block 405 schedules the CSI-RS based on a length of a period between the PDCCH and a synchronization signal block (SSB).

According to aspects of the present disclosure, a UE performing operations 400 may determine that the PDCCH of block 405 schedules the CSI-RS based on a bit in a physical broadcast channel (PBCH).

Figure 5:
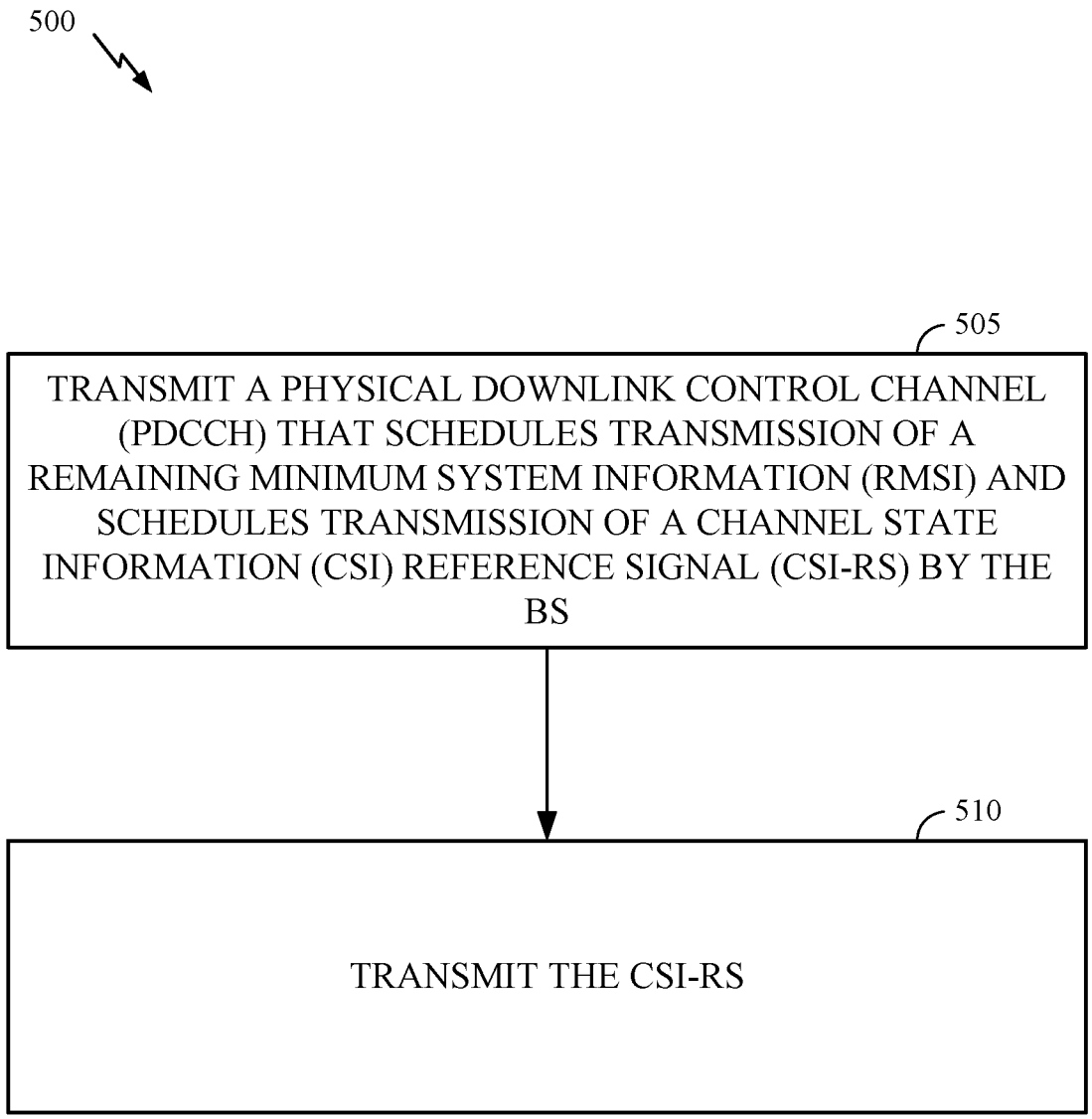
FIG. 5 is a flow diagram illustrating example operations for wireless communication by a BS, in accordance with certain aspects of the present disclosure.

FIG. 5 is a flow diagram illustrating example operations 500 for wireless communication, in accordance with certain aspects of the present disclosure. The operations 500 may be performed, for example, by a BS (e.g., such as a UE 110a in the wireless communication network 100). Operations 500 may be implemented as software components that are executed and run on one or more processors (e.g., controller/processor 240 of FIG. 2). Further, the transmission and reception of signals by the BS in operations 500 may be enabled, for example, by one or more antennas (e.g., antennas 234 of FIG. 2). In certain aspects, the transmission and/or reception of signals by the UE may be implemented via a bus interface of one or more processors (e.g., controller/processor 240) obtaining and/or outputting signals.

The operations 500 may begin, at block 505, by transmitting a physical downlink control channel (PDCCH) that schedules transmission of a remaining minimum system information (RMSI) and schedules transmission of a channel state information (CSI) reference signal (CSI-RS) by the BS.

For example, BS 110a (shown in FIG. 1) transmits a PDCCH that schedules transmission (by the BS) of RMSI and schedules transmission (by the BS) of a CSI-RS.

At block 510, operations 500 may continue by transmitting the CSI-RS. Continuing the example from above, the BS 110a transmits the CSI-RS according to the schedule in the PDCCH of block 505.

According to aspects of the present disclosure, a UE receiving the RMSI of block 505 may refine a receive beam based on the CSI-RS transmitted in block 510, and the UE may then receive the RMSI using the refined receive beam.

In aspects of the present disclosure, transmitting the CSI-RS as in block 510 may include determining one or more parameters of the CSI-RS based on a bitfield in the PDCCH and a Type0 PDCCH common search space. In some aspects of the present disclosure, the determination is further based on another bitfield in a physical broadcast channel (PBCH).

According to aspects of the present disclosure, the PDCCH of block 505 may schedule transmission of a plurality of repetitions of the RMSI, and a BS performing operations 500 may transmit a corresponding CSI-RS for each of the plurality of the repetitions of the RMSI.

In aspects of the present disclosure, the PDCCH of block 505 may schedule the CSI-RS based on a length of a period between the PDCCH and a synchronization signal block (SSB).

According to aspects of the present disclosure, the PDCCH of block 505 may schedule the CSI-RS based on a bit in a physical broadcast channel (PBCH).

Figure 6:
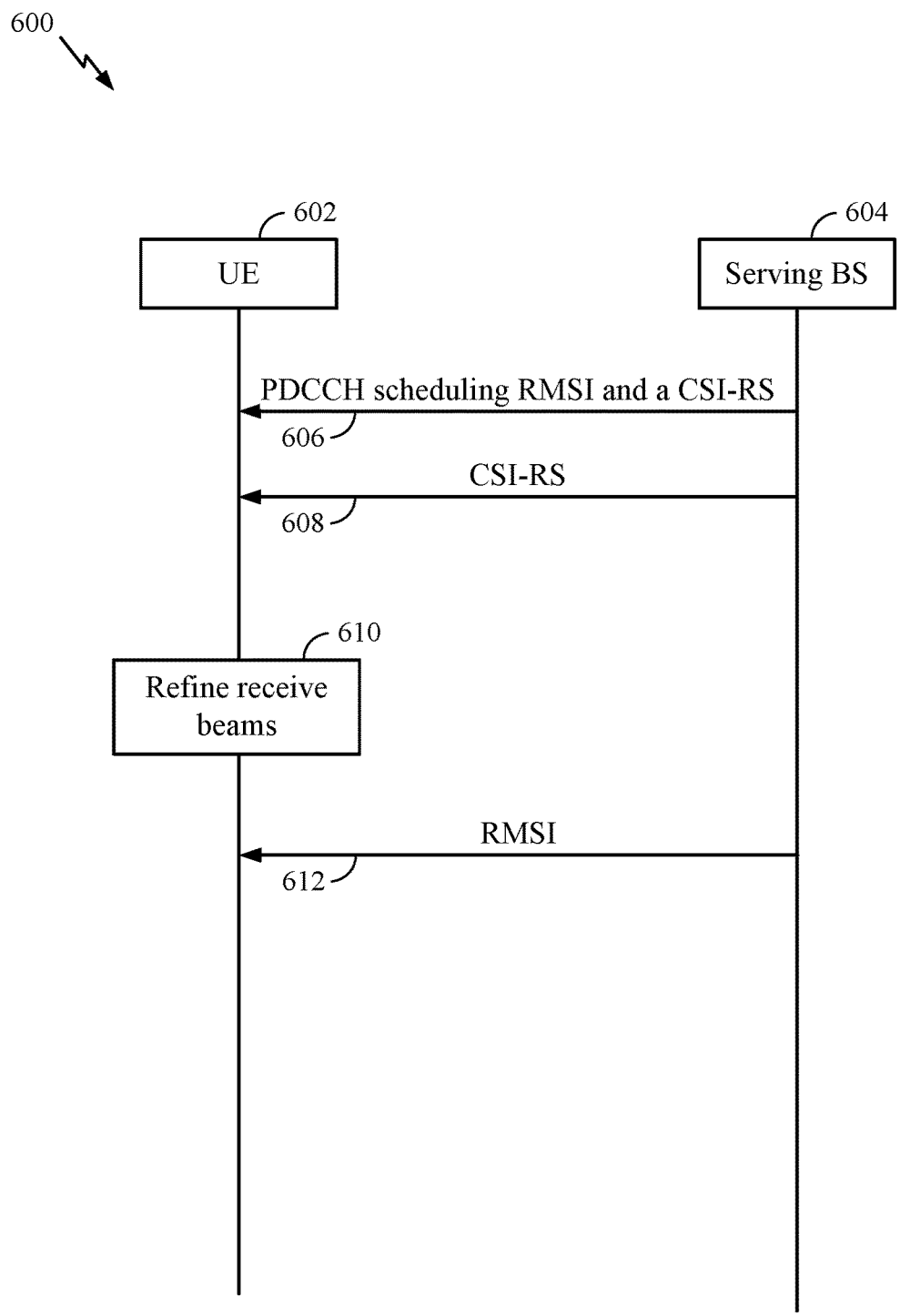
FIG. 6 is a call flow diagram illustrating example signaling for downlink beam indication set determination, in accordance with certain aspects of the present disclosure.

FIG. 6 is a call flow diagram illustrating example signaling 600 for transmitting channel state information reference signals (CSI-RS) scheduled by a remaining minimum system information (RMSI) physical downlink control channel (PDCCH) for use by a user equipment (UE) for beam refinement, in accordance with certain aspects of the present disclosure. As shown in FIG. 6, at 606, a UE 602 may receive a PDCCH scheduling RMSI and a CSI-RS from the serving BS 604. At 608, the UE processes a CSI-RS transmitted by the BS. At 610, the UE refines receive beams based on the CSI-RS. At 612, the UE may receive RMSI from the serving BS using the receive beams the UE refined at 610.

Figure 7:
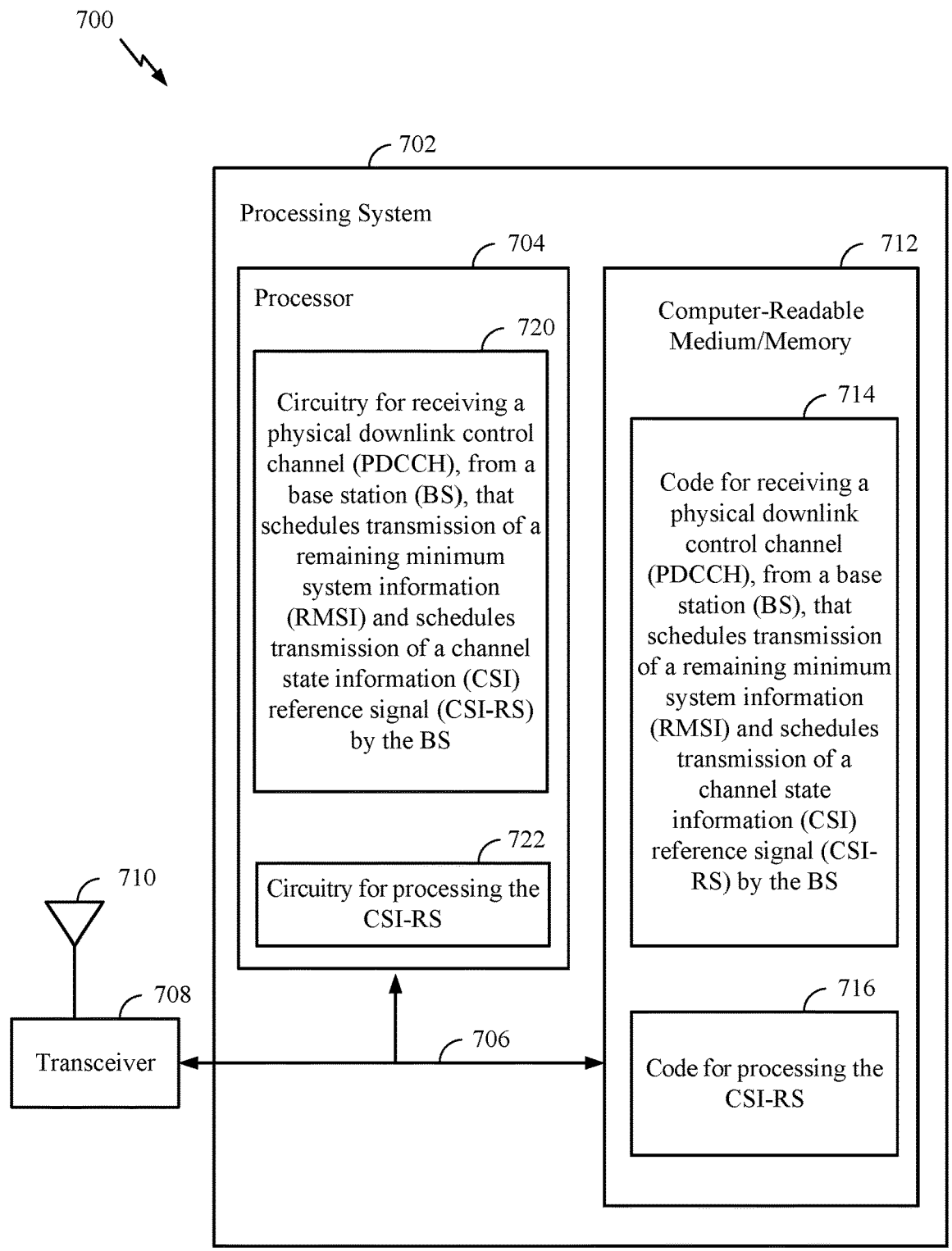
FIG. 7 illustrates a communications device that may include various components configured to perform the operations illustrated in FIG. 4, in accordance with aspects of the present disclosure.

FIG. 7 illustrates a communications device 700 that may include various components (e.g., corresponding to means-plus-function components) configured to perform operations for the techniques disclosed herein, such as the operations illustrated in FIG. 4. The communications device 700 includes a processing system 702 coupled to a transceiver 708. The transceiver 708 is configured to transmit and receive signals for the communications device 700 via an antenna 710, such as the various signals as described herein. The processing system 702 may be configured to perform processing functions for the communications device 700, including processing signals received and/or to be transmitted by the communications device 700.

The processing system 702 includes a processor 704 coupled to a computer-readable medium/memory 712 via a bus 706. In certain aspects, the computer-readable medium/memory 712 is configured to store instructions (e.g., computer-executable code) that when executed by the processor 704, cause the processor 704 to perform the operations illustrated in FIG. 4, or other operations for performing the various techniques discussed herein for processing channel state information reference signals (CSI-RS) scheduled by a remaining minimum system information (RMSI) physical downlink control channel (PDCCH) for beam refinement. In certain aspects, computer-readable medium/memory 712 stores code 714 for receiving a physical downlink control channel (PDCCH), from a base station (BS), that schedules transmission of a remaining minimum system information (RMSI) and schedules transmission of a channel state information (CSI) reference signal (CSI-RS) by the BS; and code 716 for processing the CSI-RS. In certain aspects, the processor 704 has circuitry configured to implement the code stored in the computer-readable medium/memory 712. The processor 704 includes circuitry 720 for receiving a physical downlink control channel (PDCCH), from a base station (BS), that schedules transmission of a remaining minimum system information (RMSI) and schedules transmission of a channel state information (CSI) reference signal (CSI-RS) by the BS; circuitry 722 for sending the UE an indication of one or more parameters and, for each parameter, an associated subset of the multiple beam indication sets; and circuitry 724 for determining a subset of the multiple configured beam indication sets based on the one or more parameters.

Figure 8:
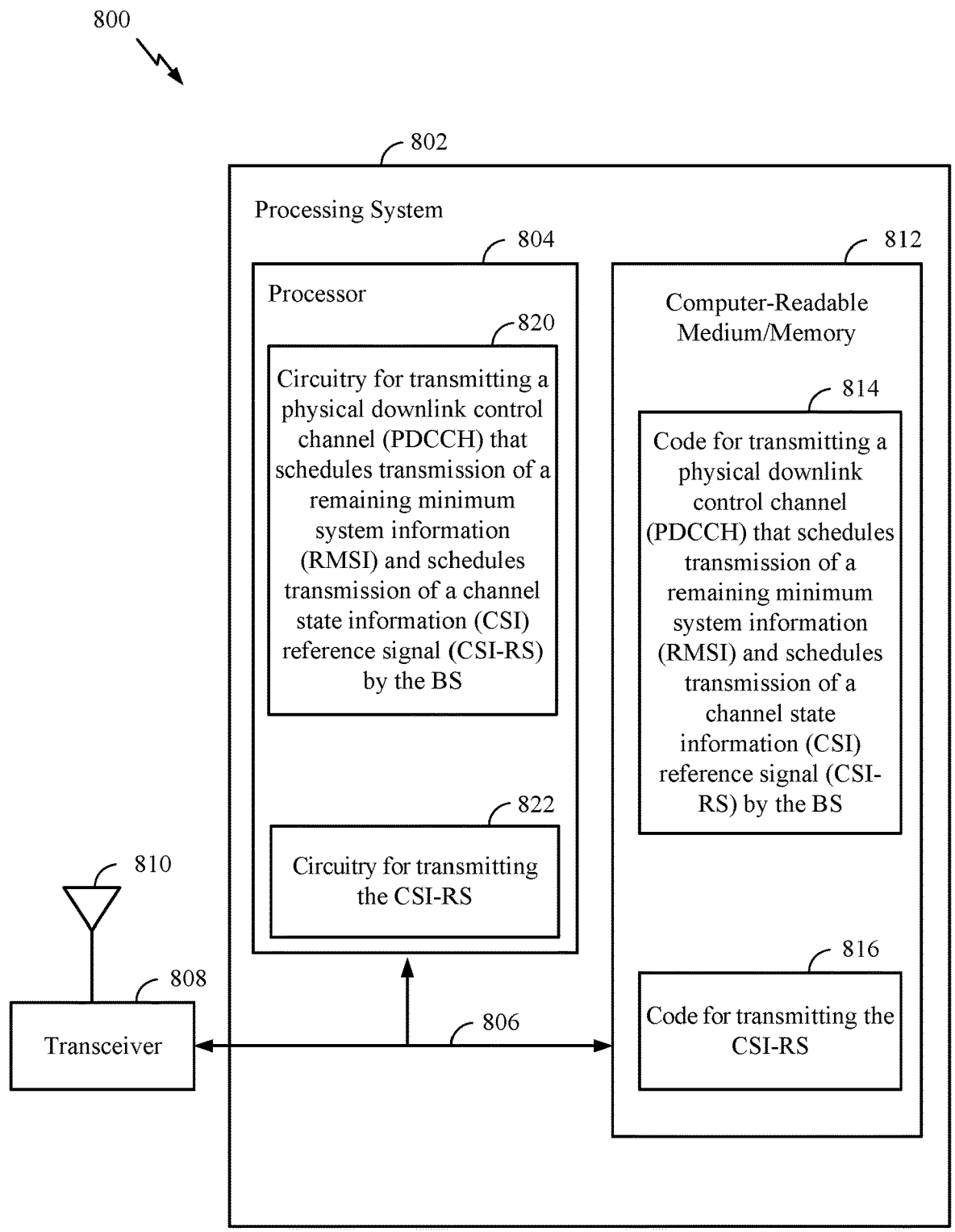
FIG. 8 illustrates a communications device that may include various components configured to perform the operations illustrated in FIG. 5, in accordance with aspects of the present disclosure.

FIG. 8 illustrates a communications device 800 that may include various components (e.g., corresponding to means-plus-function components) configured to perform operations for the techniques disclosed herein, such as the operations illustrated in FIG. 5. The communications device 800 includes a processing system 802 coupled to a transceiver 808. The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 804 to perform the operations illustrated in FIG. 5, or other operations for performing the various techniques discussed herein for transmitting channel state information reference signals (CSI-RS) scheduled by a remaining minimum system information (RMSI) physical downlink control channel (PDCCH) for use by a user equipment (UE) for beam refinement. In certain aspects, computer-readable medium/memory 812 stores code 814 for transmitting a physical downlink control channel (PDCCH) that schedules transmission of a remaining minimum system information (RMSI) and schedules transmission of a channel state information (CSI) reference signal (CSI-RS) by the BS; and code 816 for transmitting the CSI-RS. In certain aspects, the processor 804 has circuitry configured to implement the code stored in the computer-readable medium/memory 812. The processor 804 includes circuitry 820 for transmitting a physical downlink control channel (PDCCH) that schedules transmission of a remaining minimum system information (RMSI) and schedules transmission of a channel state information (CSI) reference signal (CSI-RS) by the BS; circuitry 822 for transmitting the CSI-RS.

Example Implementations

Implementation examples are described in the following numbered clauses:

1. A method for wireless communications by a user equipment (UE), comprising:
    receiving a physical downlink control channel (PDCCH), from a base station (BS), that schedules transmission of a remaining minimum system information (RMSI) and schedules transmission of a channel state information (CSI) reference signal (CSI-RS) by the BS; and
    processing the CSI-RS.
2. The method of clause 1, further comprising:
    refining a receive beam based on the CSI-RS.
3. The method of clause 2, further comprising:
    receiving the RMSI using the refined receive beam.
4. The method of any of clauses 1 through 3, wherein processing the CSI-RS comprises:
    determining one or more parameters of the CSI-RS based on a bitfield in the PDCCH and a Type0 PDCCH common search space.
5. The method of clause 4, wherein the determination is further based on another bitfield in a physical broadcast channel (PBCH).
6. The method of any of clauses 1 through 5, wherein the PDCCH schedules transmission of a plurality of repetitions of the RMSI, and the method further comprises:
    processing a corresponding CSI-RS for each of the plurality of the repetitions of the RMSI.
7. The method of any of clauses 1 through 6, further comprising:
    determining that the PDCCH schedules the CSI-RS based on a length of a period between the PDCCH and a synchronization signal block (SSB).
8. The method of any of clauses 1 through 7, further comprising:
    determining that the PDCCH schedules the CSI-RS based on a bit in a physical broadcast channel (PBCH).
9. A method for wireless communications by a base station (BS), comprising:
    transmitting a physical downlink control channel (PDCCH) that schedules transmission of a remaining minimum system information (RMSI) and schedules transmission of a channel state information (CSI) reference signal (CSI-RS) by the BS; and
    transmitting the CSI-RS.
10. The method of clause 9, wherein transmitting the CSI-RS comprises transmitting the CSI-RS prior to transmitting the RMSI.
11. The method of any of clauses 9 through 10, wherein transmitting the CSI-RS comprises determining one or more parameters of the CSI-RS based on a bitfield in the PDCCH and a Type0 PDCCH common search space.
12. The method of clause 11, wherein the determination is further based on another bitfield in a physical broadcast channel (PBCH).
13. The method of any of clauses 9 through 12, wherein the PDCCH schedules transmission of a plurality of repetitions of the RMSI, and the method further comprises:
    transmitting a corresponding CSI-RS for each of the plurality of the repetitions of the RMSI.
14. The method of any of clauses 9 through 13, wherein the PDCCH schedules the CSI-RS based on a length of a period between the PDCCH and a synchronization signal block (SSB).
15. The method of any of clauses 9 through 14, wherein the PDCCH schedules the CSI-RS based on a bit in a physical broadcast channel (PBCH).

16. In a wireless communications system, an apparatus comprising:
a memory; and
a processor coupled to the memory and configured to:
receive a physical downlink control channel (PDCCH), from a base station (BS), that schedules transmission of a remaining minimum system information (RMSI) and schedules transmission of a channel state information (CSI) reference signal (CSI-RS) by the BS; and
process the CSI-RS.

17. The apparatus of clause 16, wherein the processor is further configured to refine a receive beam based on the CSI-RS.

18. The apparatus of clause 17, wherein the processor is further configured to receive the RMSI using the refined receive beam.

19. The apparatus of any of clauses 16 through 18, wherein the processor being configured to process the CSI-RS includes the processor being configured to determine one or more parameters of the CSI-RS based on a bitfield in the PDCCH and a Type0 PDCCH common search space.

20. The apparatus of clause 19, wherein the processor is further configured to determine the one or more parameters based further on another bitfield in a physical broadcast channel (PBCH).

21. The apparatus of any of clauses 16 through 20, wherein the processor is further configured to:
determine the PDCCH schedules transmission of a plurality of repetitions of the RMSI; and
process a corresponding CSI-RS for each of the plurality of the repetitions of the RMSI.

22. The apparatus of any of clauses 16 through 21, wherein the processor is further configured to determine that the PDCCH schedules the CSI-RS based on a length of a period between the PDCCH and a synchronization signal block (SSB).

23. The apparatus of any of clauses 16 through 22, wherein the processor is further configured to determine that the PDCCH schedules the CSI-RS based on a bit in a physical broadcast channel (PBCH).

24. In a wireless communications system, an apparatus comprising:
a memory; and
a processor configured to:
transmit a physical downlink control channel (PDCCH) that schedules transmission of a remaining minimum system information (RMSI) and schedules transmission of a channel state information (CSI) reference signal (CSI-RS) by the apparatus; and
transmit the CSI-RS.

25. The apparatus of clause 24, wherein the processor being configured to transmit the CSI-RS includes the processor being configured to transmit the CSI-RS prior to transmitting the RMSI.

26. The apparatus of any of clauses 24 through 25, wherein the processor being configured to transmit the CSI-RS includes the processor being configured to determine one or more parameters of the CSI-RS based on a bitfield in the PDCCH and a Type0 PDCCH common search space.

27. The apparatus of clause 26, wherein the processor is further configured to determine the one or more parameters based on another bitfield in a physical broadcast channel (PBCH).

28. The apparatus of any of clauses 24 through 27, wherein the PDCCH schedules transmission of a plurality of repetitions of the RMSI, and the processor is further configured to transmit a corresponding CSI-RS for each of the plurality of the repetitions of the RMSI.

29. The apparatus of any of clauses 24 through 28, wherein the PDCCH schedules the CSI-RS based on a length of a period between the PDCCH and a synchronization signal block (SSB).

30. The apparatus of any of clauses 24 through 29, wherein the PDCCH schedules the CSI-RS based on a bit in a physical broadcast channel (PBCH).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The techniques described herein may be used for various wireless communication technologies, such as 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably.

A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 4 and/or FIG. 5.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
    receiving a physical downlink control channel (PDCCH), from a base station (BS), that schedules transmission of a remaining minimum system information (RMSI) and schedules transmission of a channel state information (CSI) reference signal (CSI-RS) by the BS;
    processing the CSI-RS; and
    refining a receive beam based on the CSI-RS.

2. The method of claim 1, further comprising:
    receiving the RMSI using the refined receive beam.

3. The method of claim 1, wherein processing the CSI-RS comprises:
    determining one or more parameters of the CSI-RS based on a bitfield in the PDCCH and a Type0 PDCCH common search space.

4. The method of claim 3, wherein the determination is further based on another bitfield in a physical broadcast channel (PBCH).

5. The method of claim 1, wherein the PDCCH schedules transmission of a plurality of repetitions of the RMSI, and the method further comprises:
    processing a corresponding CSI-RS for each of the plurality of the repetitions of the RMSI.

6. The method of claim 1, further comprising:
    determining that the PDCCH schedules the CSI-RS based on a length of a period between the PDCCH and a synchronization signal block (SSB).

7. The method of claim 1, further comprising:
    determining that the PDCCH schedules the CSI-RS based on a bit in a physical broadcast channel (PBCH).

8. A method for wireless communications by a base station (BS), comprising:
    transmitting a physical downlink control channel (PDCCH) that schedules transmission of a remaining minimum system information (RMSI) and schedules transmission of a channel state information (CSI) reference signal (CSI-RS) by the BS;
    determining one or more parameters of the CSI-RS based on a bitfield in the PDCCH and a Type0 PDCCH common search space; and
    transmitting the CSI-RS prior to transmitting the RMSI.

9. The method of claim 8, wherein the determination is further based on another bitfield in a physical broadcast channel (PBCH).

10. The method of claim 8, wherein the PDCCH schedules transmission of a plurality of repetitions of the RMSI, and the method further comprises:
transmitting a corresponding CSI-RS for each of the plurality of the repetitions of the RMSI.

11. A method for wireless communications by a base station (BS), comprising:
transmitting a physical downlink control channel (PDCCH) that schedules transmission of a remaining minimum system information (RMSI) and schedules transmission of a channel state information (CSI) reference signal (CSI-RS) by the BS, wherein the PDCCH schedules the CSI-RS based on a length of a period between the PDCCH and a synchronization signal block (SSB); and
transmitting the CSI-RS prior to transmitting the RMSI.

12. The method of claim 11, wherein transmitting the CSI-RS comprises determining one or more parameters of the CSI-RS based on a bitfield in the PDCCH and a Type0 PDCCH common search space.

13. The method of claim 12, wherein the determination is further based on another bitfield in a physical broadcast channel (PBCH).

14. A method for wireless communications by a base station (BS), comprising:
transmitting a physical downlink control channel (PDCCH) that schedules transmission of a remaining minimum system information (RMSI) and schedules transmission of a channel state information (CSI) reference signal (CSI-RS) by the BS, wherein the PDCCH schedules the CSI-RS based on a bit in a physical broadcast channel (PBCH); and
transmitting the CSI-RS prior to transmitting the RMSI.

15. The method of claim 14, wherein transmitting the CSI-RS comprises determining one or more parameters of the CSI-RS based on a bitfield in the PDCCH and a Type0 PDCCH common search space.

16. In a wireless communications system, an apparatus comprising:
memory; and
one or more processors coupled to the memory and, individually or collectively, configured to:
receive a physical downlink control channel (PDCCH), from a base station (BS), that schedules transmission of a remaining minimum system information (RMSI) and schedules transmission of a channel state information (CSI) reference signal (CSI-RS) by the BS;
process the CSI-RS; and
refine a receive beam based on the CSI-RS.

17. The apparatus of claim 16, wherein the one or more processors are, individually or collectively, further configured to receive the RMSI using the refined receive beam.

18. The apparatus of claim 16, wherein the one or more processors being configured to process the CSI-RS includes the one or more processors, individually or collectively, being configured to determine one or more parameters of the CSI-RS based on a bitfield in the PDCCH and a Type0 PDCCH common search space.

19. The apparatus of claim 18, wherein the one or more processors are, individually or collectively, further configured to determine the one or more parameters based further on another bitfield in a physical broadcast channel (PBCH).

20. The apparatus of claim 16, wherein the one or more processors are, individually or collectively, further configured to:
determine the PDCCH schedules transmission of a plurality of repetitions of the RMSI; and
process a corresponding CSI-RS for each of the plurality of the repetitions of the RMSI.

21. The apparatus of claim 16, wherein the one or more processors are, individually or collectively, further configured to determine that the PDCCH schedules the CSI-RS based on a length of a period between the PDCCH and a synchronization signal block (SSB).

22. The apparatus of claim 16, wherein the one or more processors are, individually or collectively, further configured to determine that the PDCCH schedules the CSI-RS based on a bit in a physical broadcast channel (PBCH).

23. In a wireless communications system, an apparatus comprising:
memory; and
one or more processors coupled to the memory and, individually or collectively, configured to:
transmit a physical downlink control channel (PDCCH) that schedules transmission of a remaining minimum system information (RMSI) and schedules transmission of a channel state information (CSI) reference signal (CSI-RS) by the apparatus;
determine one or more parameters of the CSI-RS based on a bitfield in the PDCCH and a Type0 PDCCH common search space; and
transmit the CSI-RS prior to transmitting the RMSI.

24. The apparatus of claim 23, wherein the one or more processors are, individually or collectively, further configured to determine the one or more parameters based on another bitfield in a physical broadcast channel (PBCH).

25. The apparatus of claim 23, wherein the PDCCH schedules transmission of a plurality of repetitions of the RMSI, and the one or more processors are individually or collectively, further configured to transmit a corresponding CSI-RS for each of the plurality of the repetitions of the RMSI.

26. In a wireless communications system, an apparatus comprising:
memory; and
one or more processors coupled to the memory and, individually or collectively, configured to:
transmit a physical downlink control channel (PDCCH) that schedules transmission of a remaining minimum system information (RMSI) and schedules transmission of a channel state information (CSI) reference signal (CSI-RS) by the apparatus, wherein the PDCCH schedules the CSI-RS based on a length of a period between the PDCCH and a synchronization signal block (SSB); and
transmit the CSI-RS prior to transmitting the RMSI.

27. The apparatus of claim 26, wherein the one or more processors being configured to transmit the CSI-RS includes the one or more processors, individually or collectively, being configured to determine one or more parameters of the CSI-RS based on a bitfield in the PDCCH and a Type0 PDCCH common search space.

28. The apparatus of claim 27, wherein the one or more processors are, individually or collectively, further configured to determine the one or more parameters based on another bitfield in a physical broadcast channel (PBCH).

29. In a wireless communications system, an apparatus comprising:
memory; and one or more processors coupled to the memory and, individually or collectively, configured to:

transmit a physical downlink control channel (PDCCH) that schedules transmission of a remaining minimum system information (RMSI) and schedules transmission of a channel state information (CSI) reference signal (CSI-RS) by the apparatus, wherein the PDCCH schedules the CSI-RS based on a bit in a physical broadcast channel (PBCH); and transmit the CSI-RS prior to transmitting the RMSI.

30. The apparatus of claim 29, wherein the one or more processors being configured to transmit the CSI-RS includes the one or more processors, individually or collectively, being configured to determine one or more parameters of the CSI-RS based on a bitfield in the PDCCH and a Type0 PDCCH common search space.

* * * * *